(12) United States Patent
Roque et al.

(10) Patent No.: US 10,783,283 B1
(45) Date of Patent: Sep. 22, 2020

(54) SYSTEMS AND METHODS FOR PERFORMING A RESET SEQUENCE SIMULATION IN AN ELECTRONIC DESIGN

(71) Applicant: Cadence Design Systems, Inc., San Jose, CA (US)

(72) Inventors: Thiago Radicchi Roque, Oakland, CA (US); Mateus Gonçalves Silva, Belo Horizonte (BR)

(73) Assignee: Cadence Design Systems, Inc., San Jose, CA (US)

(*) Notice: Subject to any disclaimer, the term of this patent is extended or adjusted under 35 U.S.C. 154(b) by 618 days.

(21) Appl. No.: 15/445,092

(22) Filed: Feb. 28, 2017

(51) Int. Cl.
*G06F 30/00* (2020.01)
*G06F 111/02* (2020.01)

(52) U.S. Cl.
CPC .......... *G06F 30/00* (2020.01); *G06F 2111/02* (2020.01)

(58) Field of Classification Search
CPC .............................. G06F 17/50; G06F 2217/04
USPC .................................................. 703/1, 13, 14
See application file for complete search history.

(56) References Cited

U.S. PATENT DOCUMENTS 6,732,068 B2 * 5/2004 Sample .............. G01R 31/2853
326/40

* cited by examiner

*Primary Examiner* — Saif A Alhija
(74) *Attorney, Agent, or Firm* — Mark H. Whittenberger, Esq.; Holland & Knight LLP (57) ABSTRACT

The present disclosure relates to a computer-implemented method for performing a reset sequence simulation in an electronic design. The method may include receiving, using at least one processor, a sequence file including at least one reset, input and cycle value. The method may further include sampling during a first set of cycles set forth in the sequence file and detecting stability at a time point during a first set of cycles. The method may also include bypassing sampling during one or more remaining time points of the first set of cycles, sampling during a second set of cycles set forth in the sequence file and detecting stability at a time point during a second set of cycles.

15 Claims, 7 Drawing Sheets

SYSTEMS AND METHODS FOR PERFORMING A RESET SEQUENCE SIMULATION IN AN ELECTRONIC DESIGN

FIELD OF THE INVENTION

The present disclosure relates to electronic design techniques, and more specifically, to a system and method for performing a reset sequence simulation in an electronic design

DISCUSSION OF THE RELATED ART

Simulation-based verification can be used to debug metastability convergence problems but, at present, metastability coverage metrics offered by simulation are not reliable enough to provide the level of confidence demanded by users. Metastability convergence analysis in formal verification could be done by manually adding properties to model both the effects of metastability and its propagation through the design.

When simulating an input trace that represents a reset sequence for a digital design, the simulator simulates all cycles of the input sequence, which can be very long and take a long time. In the conventional implementation convergence is not checked and the simulator must simulate all cycles as defined in the input sequence trace. Existing tools allow for the verification of convergence when a reset is specified in terms of the reset constraints of the design, but not when the user specifies an input trace as reset sequence. In most cases users do not know exactly for how many cycles some input signal values must hold in order to reset the design; therefore, the input sequence trace is usually much longer than what it needs to be. This causes the simulator to run for much longer than what in theory is required, and the overall reset process takes longer. It is difficult to determine manually for how many cycles all inputs must hold in order for reset to propagate completely. Users, using existing techniques, must perform a trial and error process when attempting to determine the amount of cycles each input must hold, and the end result is not precisely the minimum amount of cycles.

SUMMARY

In one or more embodiments of the present disclosure, a computer-implemented method for performing a reset sequence simulation in an electronic design. The method may include receiving, using at least one processor, a sequence file including at least one reset, input and cycle value. The method may further include sampling during a first set of cycles set forth in the sequence file and detecting stability at a time point during a first set of cycles. The method may also include bypassing sampling during one or more remaining time points of the first set of cycles, sampling during a second set of cycles set forth in the sequence file and detecting stability at a time point during a second set of cycles.

One or more of the following features may be included. In some embodiments, the method may include bypassing sampling during one or more remaining time points of the second set of cycles. The method may further include sampling during a third set of cycles. The method may also include detecting stability at a time point during a third set of cycles and bypassing sampling during one or more remaining time points of the third set of cycles. In some embodiments, stability may indicate that all register values are known or predictable. In some embodiments, the first set of cycles may include a first input configuration, the second set of cycles may include a second input configuration, and the third set of cycles may include a third input configuration. The method may include applying a convergence detection algorithm during at least one of the first set of cycles and the second set of cycles.

In some embodiments, a computer-readable storage medium having stored thereon instructions that when executed by a machine result in one or more operations is provided. Operations may include receiving, using at least one processor, a sequence file including at least one reset, input and cycle value. Operations may further include sampling during a first set of cycles set forth in the sequence file and detecting stability at a time point during a first set of cycles. Operations may also include bypassing sampling during one or more remaining time points of the first set of cycles, sampling during a second set of cycles set forth in the sequence file and detecting stability at a time point during a second set of cycles.

One or more of the following features may be included. In some embodiments, the method may include bypassing sampling during one or more remaining time points of the second set of cycles. Operations may further include sampling during a third set of cycles. Operations may also include detecting stability at a time point during a third set of cycles and bypassing sampling during one or more remaining time points of the third set of cycles. In some embodiments, stability may indicate that all register values are known or predictable. In some embodiments, the first set of cycles may include a first input configuration, the second set of cycles may include a second input configuration, and the third set of cycles may include a third input configuration. Operations may include applying a convergence detection algorithm during at least one of the first set of cycles and the second set of cycles.

In one or more embodiments of the present disclosure, a system for performing a reset sequence simulation in an electronic design is provided. The system may include a computing device configured to receive, using at least one processor, a sequence file including at least one reset, input and cycle value. The at least one processor may be further configured to sample during a first set of cycles set forth in the sequence file and to detect stability at a time point during a first set of cycles. The at least one processor may be further configured to bypass sampling during one or more remaining time points of the first set of cycles. The at least one processor may be further configured to sample during a second set of cycles set forth in the sequence file and detect stability at a time point during a second set of cycles.

One or more of the following features may be included. In some embodiments, the at least one processor may be further configured to bypass sampling during one or more remaining time points of the second set of cycles. The at least one processor may be further configured to sample during a third set of cycles. The at least one processor may be further configured to detect stability at a time point during a third set of cycles and bypass sampling during one or more remaining time points of the third set of cycles. In some embodiments, stability may indicate that all register values are known or predictable. The first set of cycles may include a first input configuration, the second set of cycles may include a second input configuration, and the third set of cycles may include a third input configuration.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
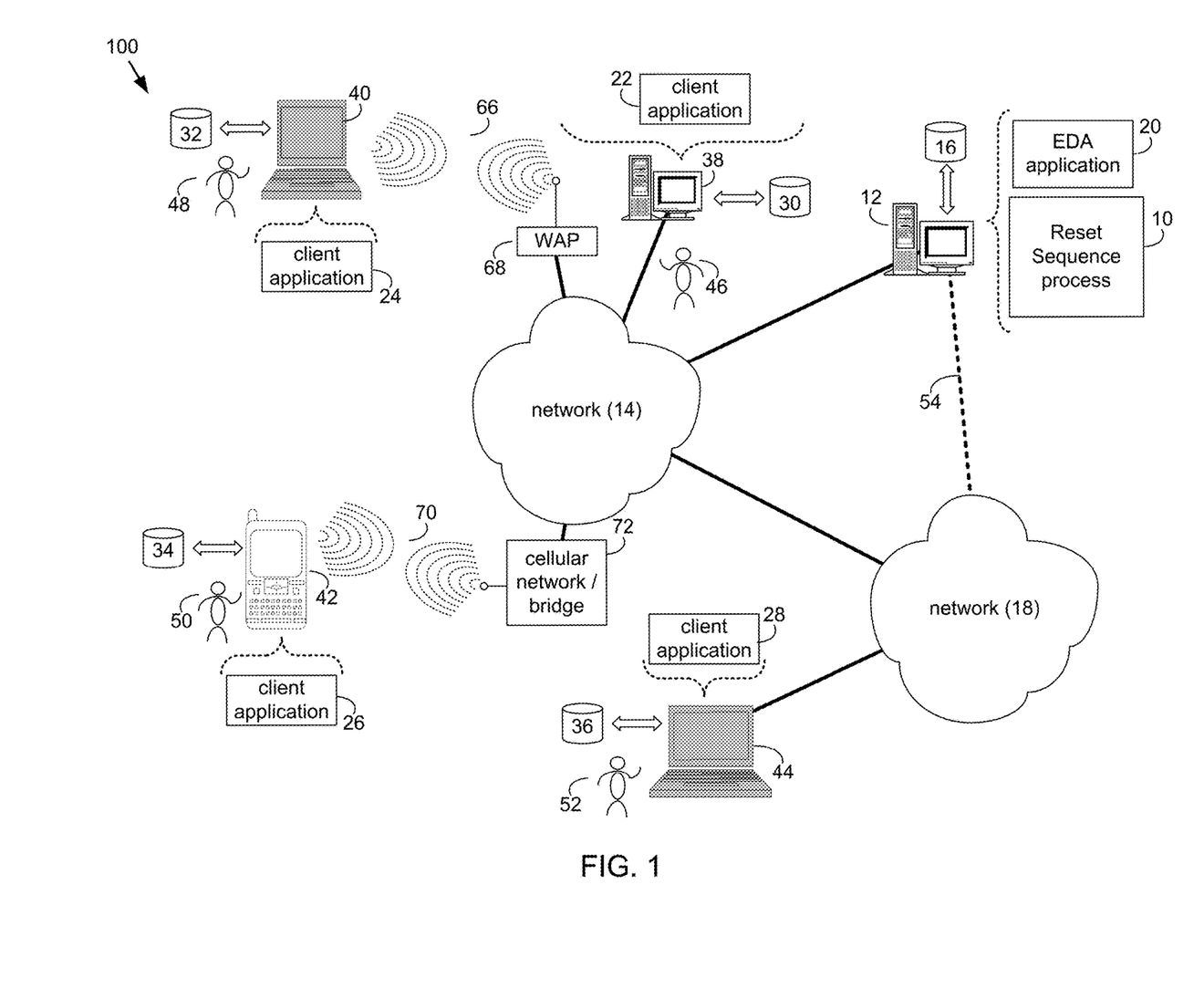
FIG. 1 is a system diagram depicting aspects of the reset sequence process in accordance with an embodiment of the present disclosure.

Referring to FIG. 1, there is shown a reset sequence process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the reset sequence process may reside on and be executed, in whole or in part, by a client electronic device, such as a personal computer, notebook computer, personal digital assistant, or the like.

The instruction sets and subroutines of reset sequence process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language ("HDL") files and/or any suitable files that may be associated with an electronic design.

Server computer 12 may execute a web server application, examples of which may include but are not limited to: Microsoft IIS, Novell Webserver™, or Apache® Webserver, that allows for HTTP (e.g., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28). EDA application 20 may be referred to herein as a design tool.

Reset sequence process 10 may be a stand alone application, or may be an applet/application/script that may interact with and/or be executed within EDA application 20. In addition/as an alternative to being a server-side process, the reset sequence process may be a client-side process (not shown) that may reside on a client electronic device (described below) and may interact with an EDA client application (e.g., one or more of EDA client applications 22, 24, 26, 28). Further, the reset sequence process may be a hybrid server-side/client-side process that may interact with EDA application 20 and an EDA client application (e.g., one or more of client applications 22, 24, 26, 28). As such, the reset sequence process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize reset sequence process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (e.g., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
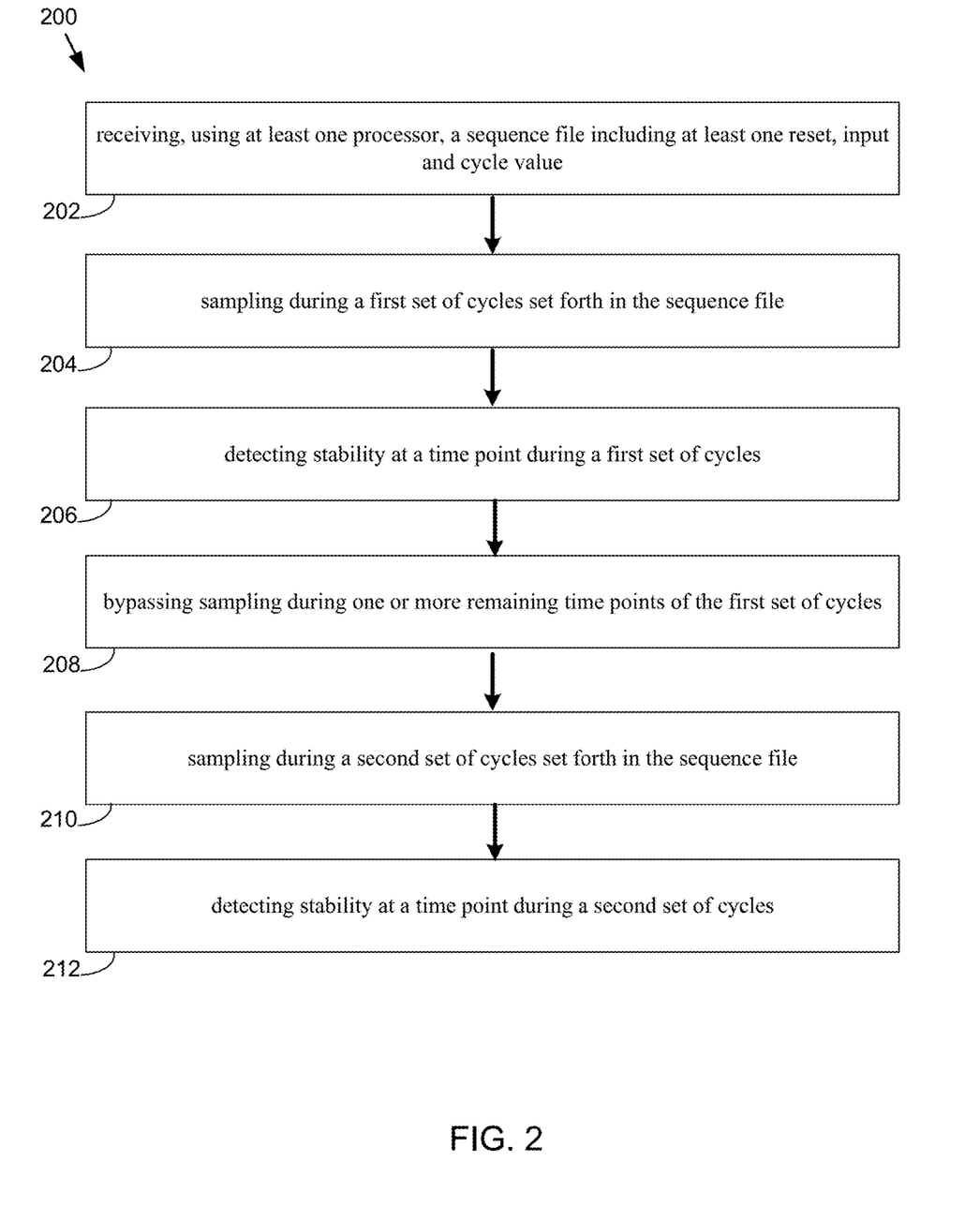
FIG. 2 is a flowchart depicting operations consistent with the reset sequence process of the present disclosure.

Referring now to FIG. 2, a method 200 consistent with an embodiment of reset sequence process 10 is provided. The method may include receiving (202), using at least one processor, a sequence file including at least one reset, input and cycle value. The method may further include sampling (204) during a first set of cycles set forth in the sequence file and detecting (206) stability at a time point during a first set of cycles. The method may also include bypassing (208) sampling during one or more remaining time points of the first set of cycles, sampling (210) during a second set of cycles set forth in the sequence file and detecting (212) stability at a time point during a second set of cycles.

Figure 3:
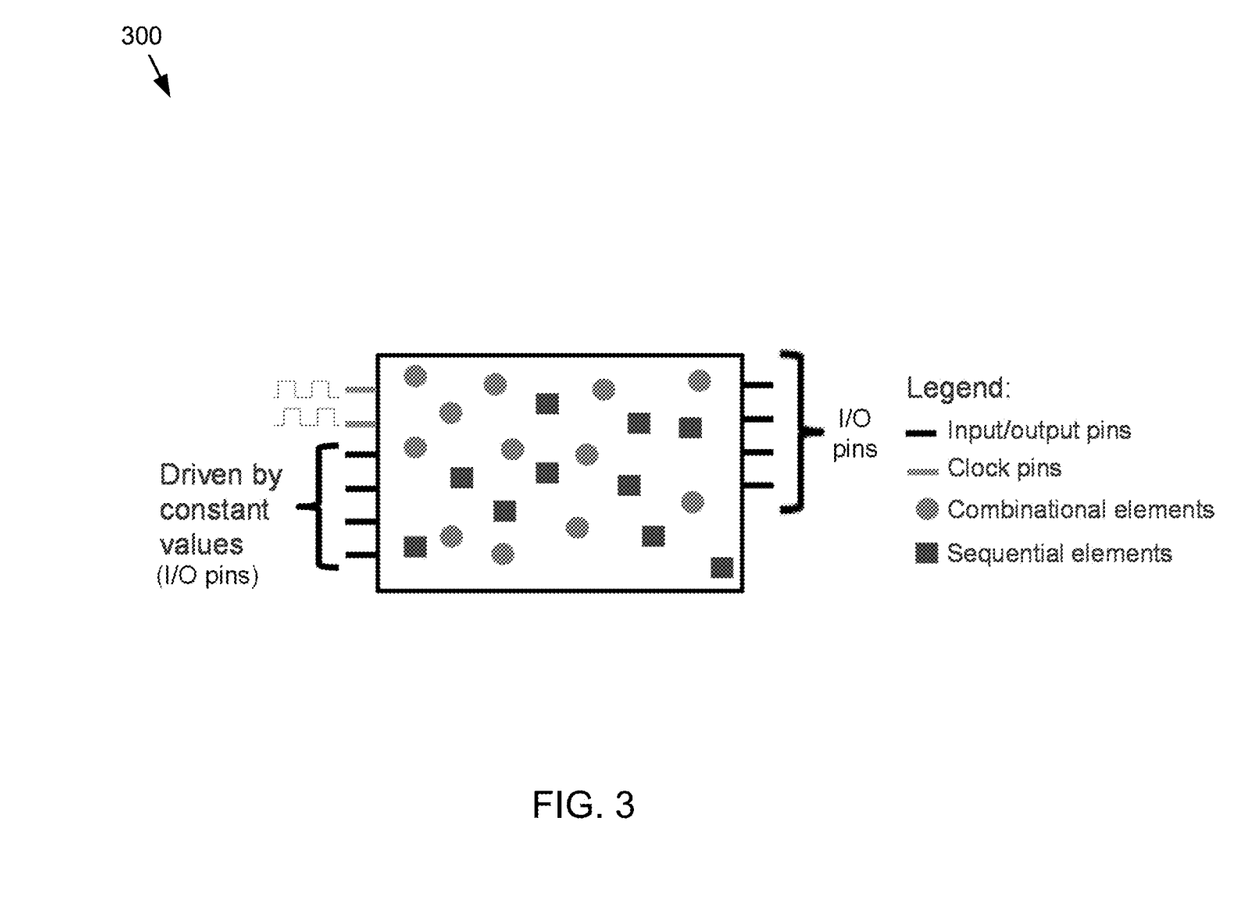
FIG. 3 is a diagram depicting an example of convergence during a circuit simulation.

Referring also to FIG. 3, a schematic 300 consistent with an embodiment of reset sequence process 10 is provided. Embodiments of reset sequence process 10 may be configured to perform a fast forward reset sequence simulation by calculating register convergence between input value changes As discussed above, when simulating an input trace that represents a reset sequence for a digital design, the simulator simulates all cycles of the input sequence, which can be very long and take a long time.

Embodiments of reset sequence process 10 may be configured to calculate if the simulation achieved convergence between the input trace value changes and may fast forward the simulation to the next value change if convergence has been achieved. This may potentially reduce the simulated number of cycles, reducing the overall time spent on the simulation.

As used herein the term "convergence" may refer to a situation when all registers values (e.g., associated with a circuit simulation) are stable after a certain cycle in the simulation. During a reset sequence simulation there can be several convergence cycles in between the input sequence values, since the input sequence trace may not be minimal in number of cycles.

Referring now to FIG. 3, in some embodiments, given an input value set which is constant in a given time range, convergence may refer to a situation where values of sequential elements achieve predictable value pattern in the entire time range for the current input value set. Circuits may be paced by clock ticks (e.g., some time range=a clock cycle). Values of sequential elements may be compared periodically.

Figure 4:
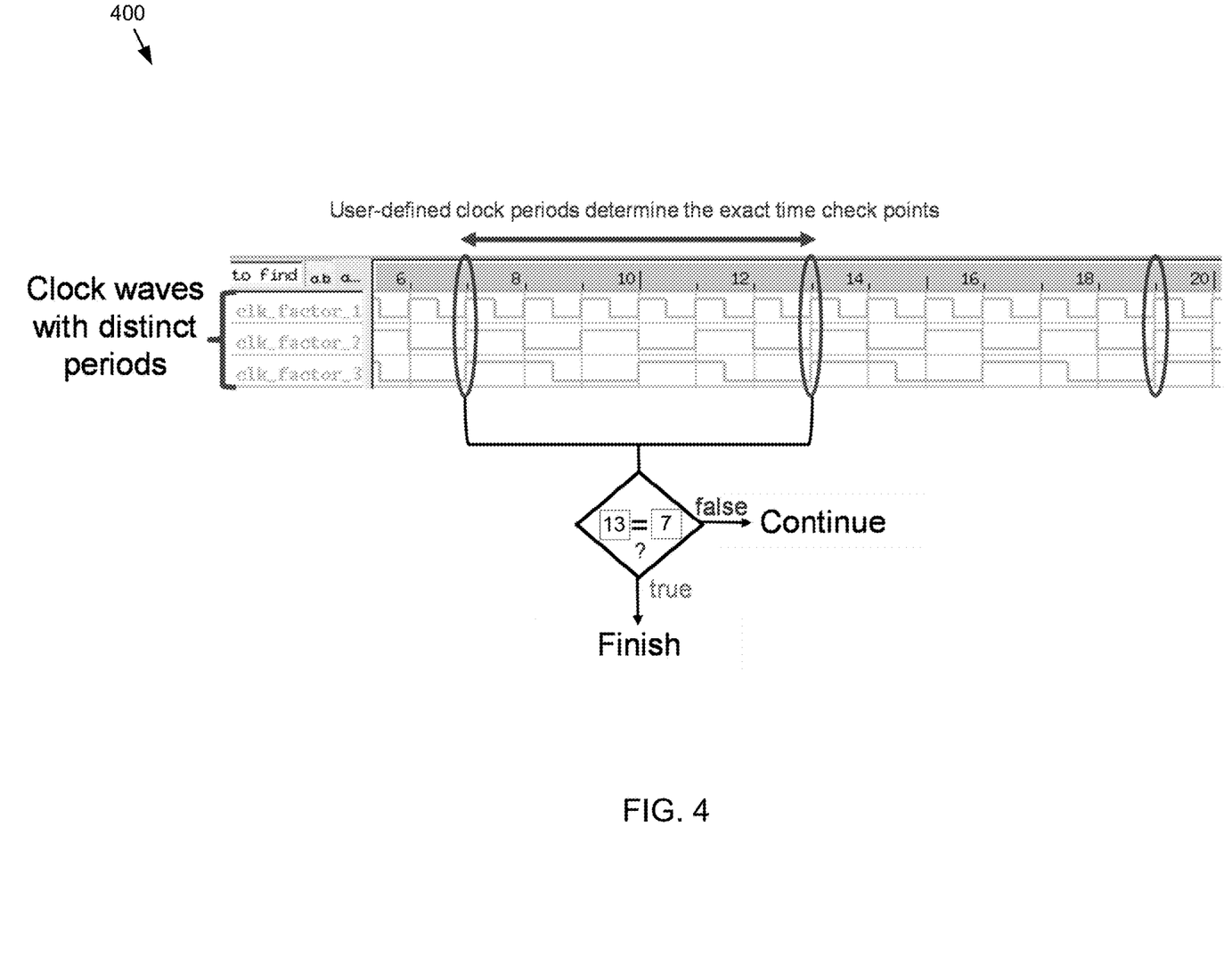
FIG. 4 is a diagram depicting an example of convergence during a circuit simulation.

Referring now to FIG. 4, an embodiment 400 depicting one example of convergence criteria is provided. In this particular example, there may be no value changes in flops and latches outputs in between the two cycles in which all design registers may sample according to the clock setup. In some embodiments, the check cycle formula may be based on the least common multiplier (LCM) of all user-defined clock periods.

As discussed above, in the conventional implementation convergence is not checked and the simulator must simulate all cycles as defined in the input sequence trace. Existing tools allow for the verification of convergence when a reset is specified in terms of the reset conditions of the design, but not when the user specifies an input trace as reset sequence. In most cases users do not know exactly for how many cycles some input signal values must hold, therefore the input sequence trace is usually much longer than what it needs to be in order to reset the design. This causes the simulator to run for much longer than what in theory it needs to, and the overall reset process takes longer. It is difficult to determine manually for how many cycles all inputs must hold in order for reset to propagate completely. Users, using existing techniques, must perform a trial and error process when trying to determine the amount of cycles each input must hold, and the end result is not precisely the minimum amount of cycles.

Figure 5:
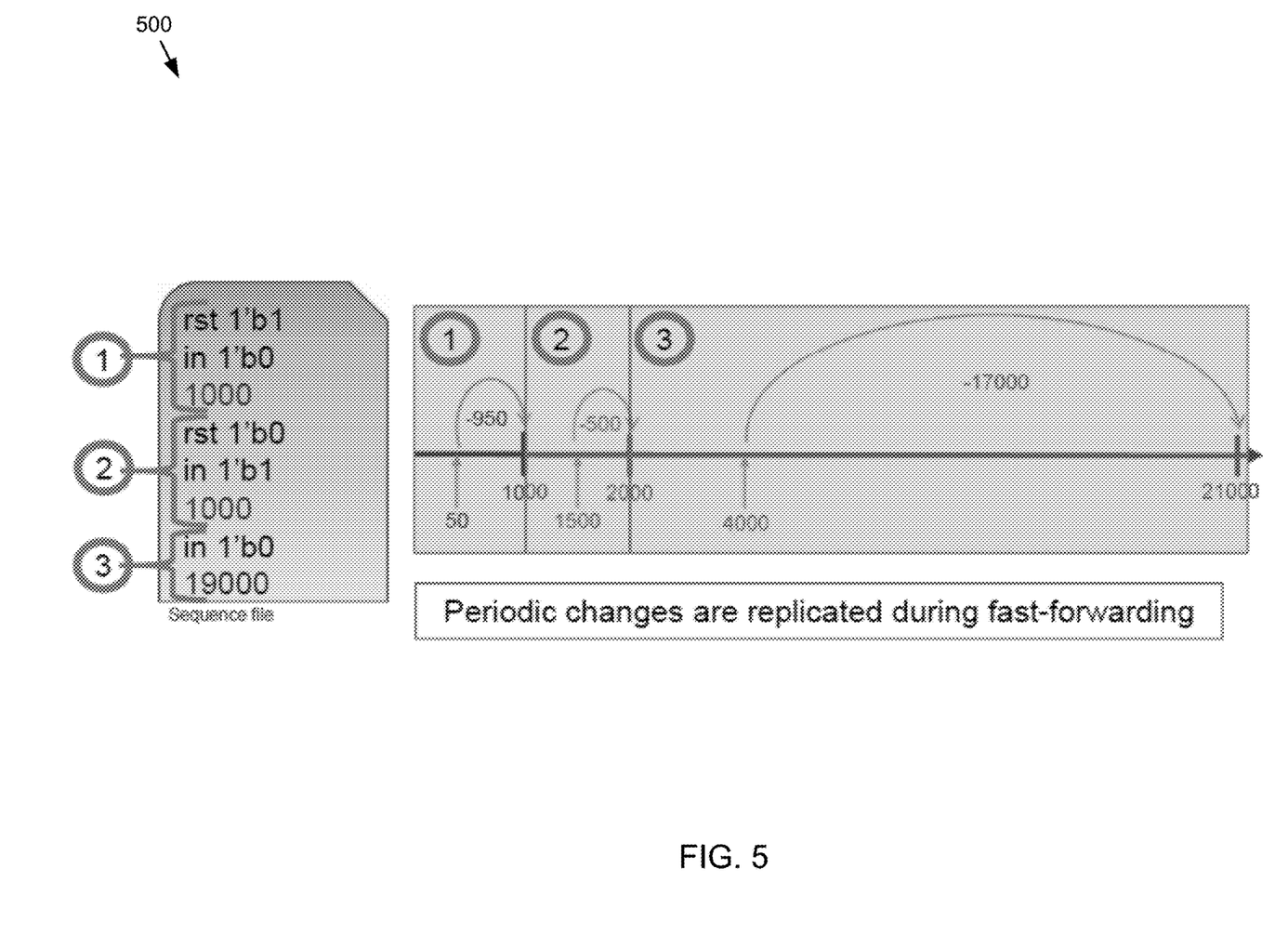
FIG. 5 is a diagram depicting aspects of the reset sequence process in accordance with an embodiment of the present disclosure.

As shown in FIG. 5, embodiments of reset sequence process 10 may be configured to first, when reading the reset sequence input trace, store all cycles where value changes happen. This provides the ranges where convergence must be analyzed. During simulation, embodiments of reset sequence process 10 may test convergence in between each of these ranges, and if convergence is found in the middle of a range, fast forward simulation to the beginning of the next range. Embodiments of reset sequence process 10 may analyze design convergence in reset analysis in-between value changes of the input trace, and when convergence is detected, fast-forward the simulation to the next value-change.

In some embodiments, the sequence file shown in FIG. 5 may include various types of information. Some of these types of information may include, but are not limited to, inputs, values, cycles, reset signals, etc. In some embodiments, a reset sequence file may be manually created and an EDA application or tool, such as those shown in FIG. 1, may be used to read the sequence file and apply the parameters to an electronic design to be simulated.

In some embodiments, the reset pin may be similar to any other input in the sequence file, but it makes sense to emphasize that usually one or more reset pins are included in the file, even though it is not a requirement.

FIG. 5 shows a sequence file that has three sets of input assignments and the number of cycles until the next change. However, it should be noted that this number is not frozen. The sequence file enables describing any kind of sequence of inputs that must hold during simulation. Therefore, the user may define as many "sets" as needed for describing the desired sequence. Accordingly, it could be n sets, and which set could have n input signals. The number of cycles between "sets" could be n as well. Then, the convergence analysis may be performed in each "set". Finally, the approach can potentially proceed n fast-forwards.

Referring again to FIG. 5, three distinct input configurations are shown in the figure and are depicted by the numbers 1, 2, and 3 on the diagram. Each input configuration shows a reset signal, an input signal (in some examples reset may be an input pin) and a number of cycles (e.g. 1000 cycles in input configuration 1, 1000 cycles in input configuration 2, and 19000 cycles in input configuration 3. In some embodiments, a cycle may correspond to a time period such as a second, etc.

In operation, and as can be seen in FIG. 5, in this particular example sampling may be performed until stability is detected, in this case, stability was detected at time 50. In this example, reset sequence process 10 may skip ahead 950 cycles to the next input configuration beginning at cycle 1000 at which point convergence detection may restart. Similarly, stability was detected at time 1500 during the second input configuration (skipping ahead 500) and at time 4000 (skipping ahead 17000) during the third input configuration. It should be noted that each of numbers 1, 2, and 3 may correspond to actual execution in an EDA tool.

Figure 6:
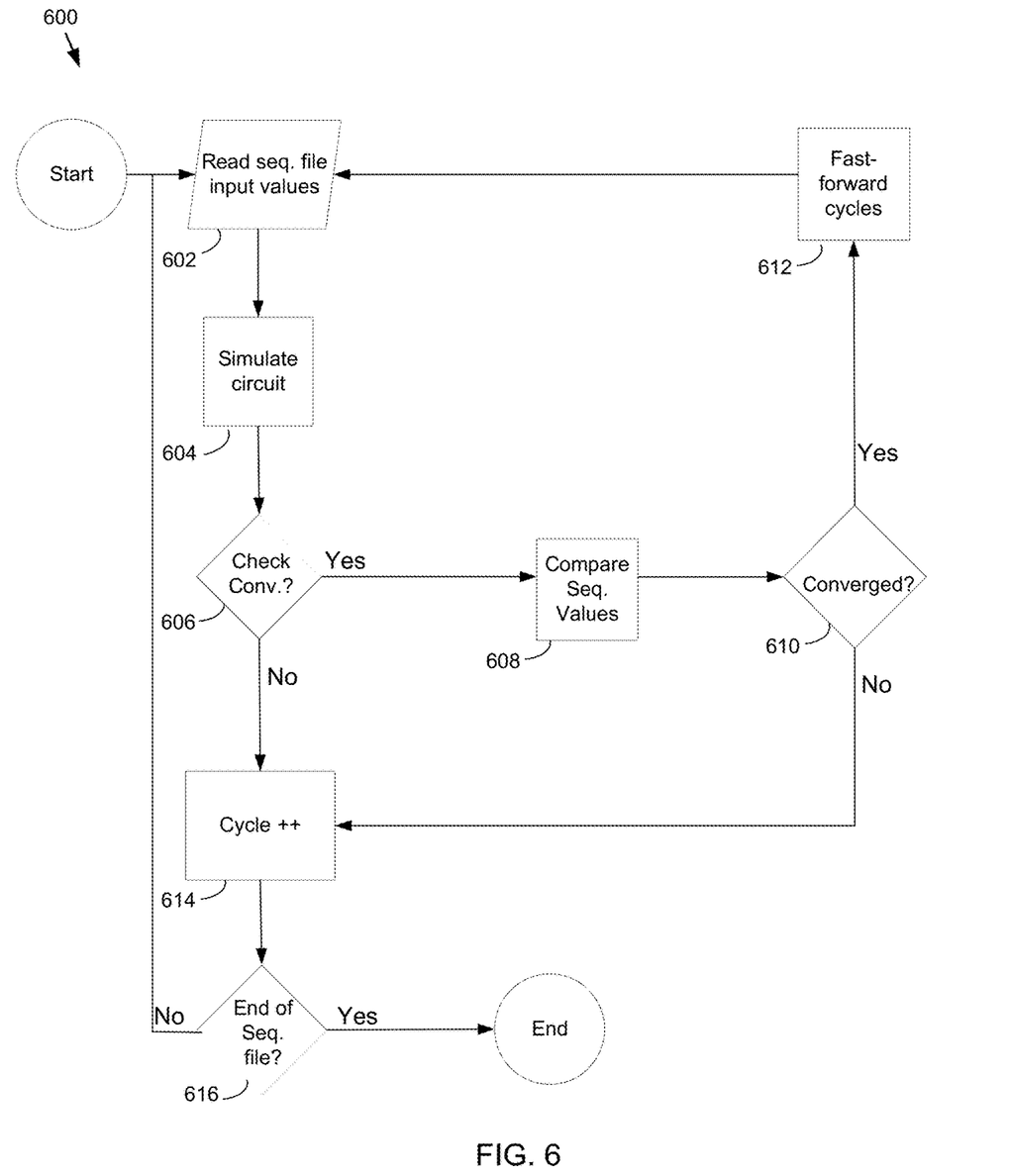
FIG. 6 is a flowchart depicting operations consistent with the reset sequence process of the present disclosure.

Referring also to FIG. 6, a flowchart 600 depicting an embodiment consistent with reset sequence process 10 is provided. In operation, the sequence file input values may be read 602 and an electronic circuit may be simulated 604. Reset sequence process 10 may check 606 for convergence. This may involve comparing 608 sequence values and determining 610 whether or not there is convergence. If yes, then the fast forwarding may be performed. If there is not convergence then the process may continue through to one or more cycles 614 until the end of the sequence file 616 is reached.

Figure 7:
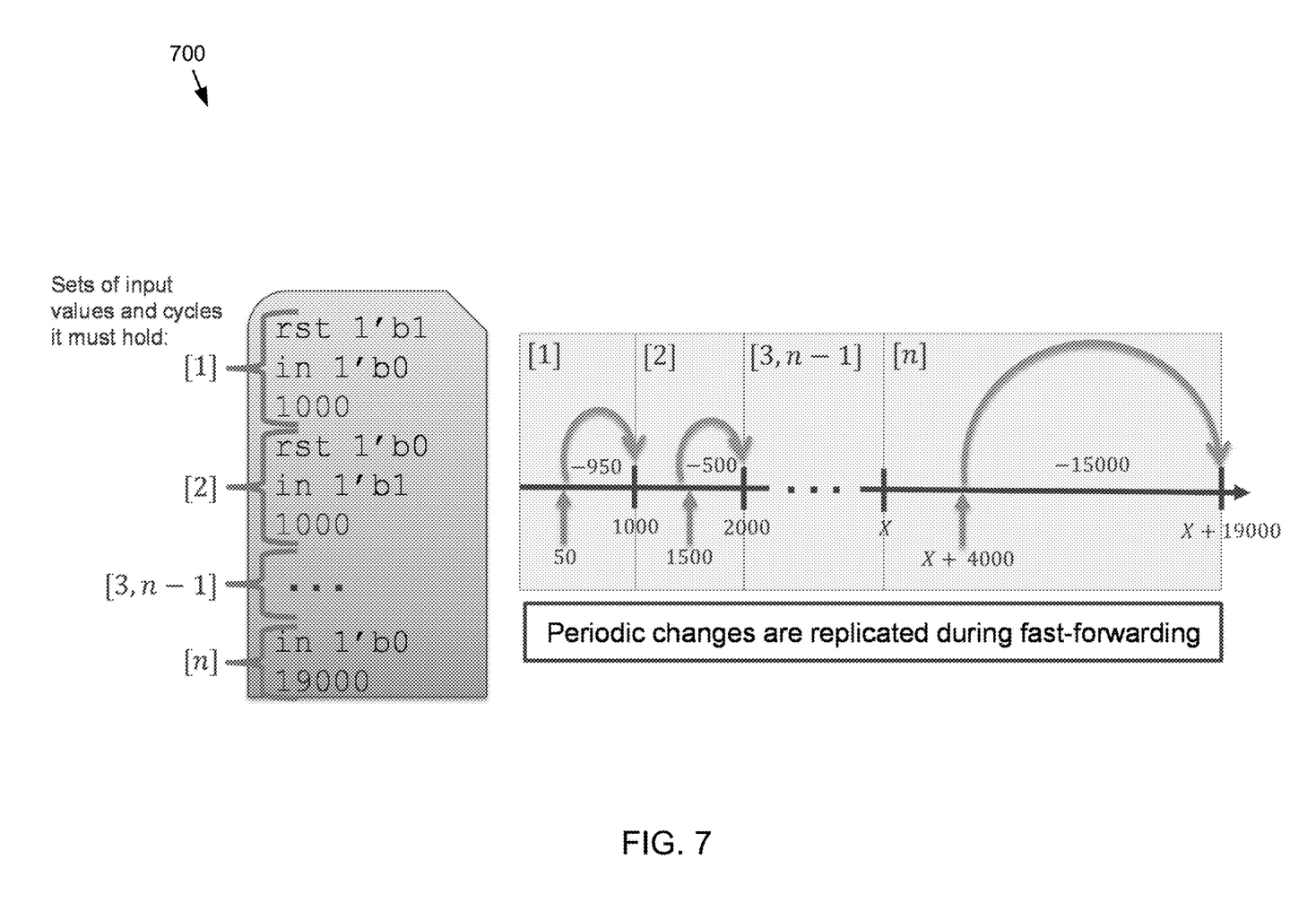
FIG. 7 is a diagram depicting aspects of the reset sequence process in accordance with an embodiment of the present disclosure.

In some embodiments, and referring also to FIG. 7, a sequence file may include at least one reset, input and cycle value. Accordingly, it corresponds to a set of input and reset values and a cycle value, which is how long it takes in terms of number of cycles. In this way, it could have n sets, which may be simulated cycle by cycle in a sequential way. In each set, there may be periodic stability checks (according to some rules described in the convergence explanation). If stability is detected, the simulation may be bypassed to the beginning of the next set. This process may be recursive until the end of the sequence file.

Accordingly, embodiments of reset sequence process 10 may apply convergence tests between each value change described in a sequence file. Reset simulation can be fast-forwarded to the next change in case of convergence. In one particular test case, the performance time was reduced from 2 hours to 6 minutes due to this convergence algorithm. In some embodiments, periodic changes are replicated during fast-forwarding.

In some embodiments, EDA application 20 and/or reset sequence process 10 may support a variety of languages and/or standards. EDA application 20 may support one or more software extensions and may be used in conjunction with one or more EDA tools such as those available from the Assignee of the subject application.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for performing a reset sequence simulation in an electronic design comprising:
receiving, using at least one processor, a sequence file including at least one reset, input and cycle value, wherein the sequence file includes a user-specified input trace configured as a reset sequence;
reading a reset sequence input trace from the sequence file;
storing all cycles where value changes occur in the reset sequence input trace;
during simulation, sampling during a first set of cycles set forth in the sequence file;
detecting stability associated with the first set of cycles at a time point located between endpoints associated with the first set of cycles, wherein stability indicates that all register values are known or predictable;
bypassing sampling during one or more remaining time points of the first set of cycles, wherein bypassing sampling includes fast-forwarding to a beginning point of a second set of cycles;
sampling during the second set of cycles set forth in the sequence file;
detecting stability associated with the second set of cycles at a time point during the second set of cycles; and
recursively sampling one or more cycles and detecting stability until an end of the sequence file is reached.

2. The computer-implemented method of claim 1, further comprising:
bypassing sampling during one or more remaining time points of the second set of cycles.

3. The computer-implemented method of claim 1, further comprising:
sampling during a third set of cycles.

4. The computer-implemented method of claim 3, further comprising:
detecting stability at a time point during a third set of cycles; and
bypassing sampling during one or more remaining time points of the third set of cycles.

5. The computer-implemented method of claim 4, wherein the first set of cycles has a first input configuration, the second set of cycles has a second input configuration, and the third set of cycles has a third input configuration.

6. A non-transitory computer-readable storage medium having stored thereon instructions that when executed by a machine result in the following operations:
receiving, using at least one processor, a sequence file including at least one reset, input and cycle value, wherein the sequence file includes a user-specified input trace configured as a reset sequence;
reading a reset sequence input trace from the sequence file;
storing all cycles where value changes occur in the reset sequence input trace;
during simulation, sampling during a first set of cycles set forth in the sequence file;
detecting stability associated with the first set of cycles at a time point located between endpoints associated with the first set of cycles, wherein stability indicates that all register values are known or predictable;

bypassing sampling during one or more remaining time points of the first set of cycles, wherein bypassing sampling includes fast-forwarding to a beginning point of a second set of cycles;

sampling during the second set of cycles set forth in the sequence file;

detecting stability associated with the second set of cycles at a time point during the second set of cycles; and recursively sampling one or more cycles and detecting stability until an end of the sequence file is reached.

7. The computer-readable storage medium of claim 6, further comprising:
bypassing sampling during one or more remaining time points of the second set of cycles.

8. The computer-readable storage medium of claim 6, further comprising:
sampling during a third set of cycles.

9. The computer-readable storage medium of claim 8, further comprising:
detecting stability at a time point during a third set of cycles; and
bypassing sampling during one or more remaining time points of the third set of cycles.

10. The computer-readable storage medium of claim 9, wherein the first set of cycles has a first input configuration, the second set of cycles has a second input configuration, and the third set of cycles has a third input configuration.

11. A system for performing a reset sequence simulation in an electronic design comprising:
a computing device configured to receive, using at least one processor, a sequence file including at least one reset, input and cycle value, wherein the sequence file includes a user-specified input trace configured as a reset sequence, the at least one processor further configured to read a reset sequence input trace from the sequence file and to store all cycles where value changes occur in the reset sequence input trace, the at least one processor further configured to, during simulation, sample during a first set of cycles set forth in the sequence file and to detect stability associated with the first set of cycles at a time point located between endpoints associated with the first set of cycles, wherein stability indicates that all register values are known or predictable, the at least one processor further configured to bypass sampling during one or more remaining time points of the first set of cycles, wherein bypassing sampling includes fast-forwarding to a beginning point of a second set of cycles, the at least one processor further configured to sample during a second set of cycles set forth in the sequence file and detect stability associated with the second set of cycles at a time point during the second set of cycles, the at least one processor further configured to recursively sample one or more cycles and detecting stability until an end of the sequence file is reached.

12. The system for performing a reset sequence simulation in an electronic design of claim 11, wherein the at least one processor is further configured to bypass sampling during one or more remaining time points of the second set of cycles.

13. The system for performing a reset sequence simulation in an electronic design of claim 11, wherein the at least one processor is further configured to sample during a third set of cycles.

14. The system for performing a reset sequence simulation in an electronic design of claim 13, wherein the at least one processor is further configured to detect stability at a time point during a third set of cycles and bypass sampling during one or more remaining time points of the third set of cycles.

15. The system for performing a reset sequence simulation in an electronic design of claim 14, wherein the first set of cycles has a first input configuration, the second set of cycles has a second input configuration, and the third set of cycles has a third input configuration.

\* \* \* \* \*